United States Patent
Yin et al.

(10) Patent No.: US 10,860,597 B2
(45) Date of Patent: Dec. 8, 2020

(54) REPORTING SYSTEM FOR TRANSACTION SERVER USING CLUSTER STORED AND PROCESSED DATA

(71) Applicant: Workday, Inc., Pleasanton, CA (US)

(72) Inventors: Nianlong Yin, Pleasanton, CA (US); Jian Ping Chen, San Leandro, CA (US); Anil Malkani, Fremont, CA (US); Manoj Samel, Pleasanton, CA (US); Aleksandar Ivanov, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 327 days.

(21) Appl. No.: 15/085,880

(22) Filed: Mar. 30, 2016

(65) Prior Publication Data
US 2017/0286506 A1 Oct. 5, 2017

(51) Int. Cl.
*G06F 16/25* (2019.01)
(52) U.S. Cl.
CPC .................. *G06F 16/254* (2019.01)
(58) Field of Classification Search
None
See application file for complete search history.

(56) References Cited

U.S. PATENT DOCUMENTS

| | | | | |
|---|---|---|---|---|
| 6,014,670 | A * | 1/2000 | Zamanian | G06F 16/254 |
| 2006/0235831 | A1 | 10/2006 | Adinolfi | |
| 2008/0016086 | A1 * | 1/2008 | Chang | G06F 16/248 |
| 2010/0036824 | A1 * | 2/2010 | Gu | G06F 17/30545 707/797 |
| 2012/0144448 | A1 * | 6/2012 | Gunawardena | G06F 17/30159 726/1 |
| 2012/0254118 | A1 | 10/2012 | Shah | |
| 2014/0046906 | A1 | 2/2014 | Patiejunas | |
| 2014/0129511 | A1 * | 5/2014 | Bramel | G06F 21/6218 707/600 |
| 2014/0229423 | A1 * | 8/2014 | Bengali | G06F 17/30563 707/602 |
| 2015/0169712 | A1 * | 6/2015 | Bhide | G06F 17/30563 707/602 |
| 2017/0109418 | A1 * | 4/2017 | Bartlett | G06F 17/30563 |

* cited by examiner

*Primary Examiner* — Hau H Hoang
(74) *Attorney, Agent, or Firm* — Van Pelt, Yi & James LLP (57) ABSTRACT

A system for reporting for a transaction server using cluster stored and processed data. The system comprises a processor and an interface. The processor is to cause ingestion of data from an ingestion source on a cluster system and store a security definition and a transformation definition for one or more data sources that are derived from the data from the ingestion source. The security definition includes a tenant associated with each data source of the one or more data sources. The processor is further to cause execution of cluster processing associated with a report using the one or more data sources and based at least in part on a determination of authorization using the security definitions to produce an output of the cluster processing and generate a report using a transaction server process and the output of the cluster processing. The interface is to provide the report.

21 Claims, 11 Drawing Sheets

REPORTING SYSTEM FOR TRANSACTION SERVER USING CLUSTER STORED AND PROCESSED DATA

BACKGROUND OF THE INVENTION

In some cases, a transaction system is asked to report on a large data set. To ingest the large data set into the transaction system for processing can take considerable time and consume significant memory resources. In addition, once ingested, processing the large data set would require substantial processing resources and because of this require a long period of time in order to complete the calculations. These obstacles can make it infeasible to produce the report. This is especially true if multiple reports are requested each with their own corresponding large data sets.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for reporting for a transaction server using cluster stored and processed data. The system comprises a processor and an interface. The processor is to cause ingestion of data from an ingestion source on a cluster system and store a security definition and a transformation definition for one or more data sources that are derived from the data from the ingestion source. The security definition includes a tenant associated with each data source of the one or more data sources. The processor is further to cause execution of cluster processing associated with a report using the one or more data sources and based at least in part on a determination of authorization using the security definitions to produce an output of the cluster processing and generate a report using a transaction server process and the output of the cluster processing. The interface is to provide the report.

In some embodiments, a cluster data system comprises a system for transparently offering extended functionality to a transaction server system using a cluster system. In some embodiments, a data set is ingested into a cluster for offering support for or access availability to a transaction server to be able to perform functionality on the data set. For example, in the event that it is not desirable for the data set to be directly ingested (e.g., because the data set is large or not intended to be stored within the system), the data set is ingested into a cluster and processed in the cluster as if the data set is native to the transaction server. In some embodiments, the system behavior associated with the data set includes security behavior (e.g., tenant associated security behavior, access associated security behavior, etc.). In some embodiments, the processing of the data set on the cluster is achieved by providing processing instructions to the cluster that provide a desired result. In various embodiments, a report is compiled on a transaction server using data native to on the transaction server and/or from a cluster system (e.g., processed data or unprocessed data from the cluster system).

In some embodiments, a transaction system manages data using a database. In some embodiments, the database comprises an object-based database (e.g., the database stores a set of objects, each object comprising data and relations to other objects). In some embodiments, the transactional database comprises a database that stores an ordered set of transactions, each transaction representing a modification to one or more objects, enabling any historical state of the database to be recovered. In some embodiments, the transaction system (e.g., an object-based transactional database) is in communication with a data processing system. In some embodiments, the data processing system comprises a cluster system. In various embodiments, the cluster system comprises a cluster system for ingesting data, for storing data, for processing data, for providing the results of processes executed on stored data, for interacting with large data sets, for interacting with big data, or for any other appropriate purpose. In some embodiments, a user interacts with the database to provide indications to the cluster system. In various embodiments, a user interacts with the database to provide an indication to the cluster system to ingest a data set, to store a data set, to store authentication information, to store a job definition, to execute a job, to provide job results, or to perform any other appropriate data processing action.

In some embodiments, a user interacts with the transaction system to indicate to the cluster system to ingest data. The cluster system is able to ingest data from one or more data sources (e.g., data collection systems, data measurement systems, websites that collect user data, etc.). In some embodiments, the user provides authentication information for accessing a data source. The cluster system stores a data set comprising ingested data. In some embodiments, the user provides security information associated with the data set. In various embodiments, security information comprises information describing one or more users able to access the data set, one or more categories of users able to access the data set, one or more authority levels able to access the data set, a password associated with the data set, or any other appropriate security information. In some embodiments, security information associated with the data set is stored on the transaction server.

In some embodiments, a user interacts with the transaction system to indicate a process definition for a process (e.g., processing for generating a report from one or more sources of data stored on the cluster). In some embodiments, the process comprises a process for data analysis. In some embodiments, a data set ingested by the cluster system is a subset of or all the data of the data source for the process. In some embodiments, a process definition comprises an indication of a data set for use as a data source. In some embodiments, the process definition is stored. In some embodiments, the process definition is stored on the transaction system. The user provides an indication to the transaction system to execute the process using the process definition. The transaction server then provides an indication to the cluster system to execute the process. In some embodiments, the transaction system provides an indication of the process definition to the cluster system for execution. The cluster system executes the process and makes the results available to the transaction system. In some embodiments, the cluster system provides the results to the transactions system. In some embodiments, a transaction system data source is created for reading process results. In some embodiments, transaction system reports are built using transaction system data sources. In some embodiments, when a transaction system report is run, process results are retrieved from the cluster system and used to create the report.

Figure 1:
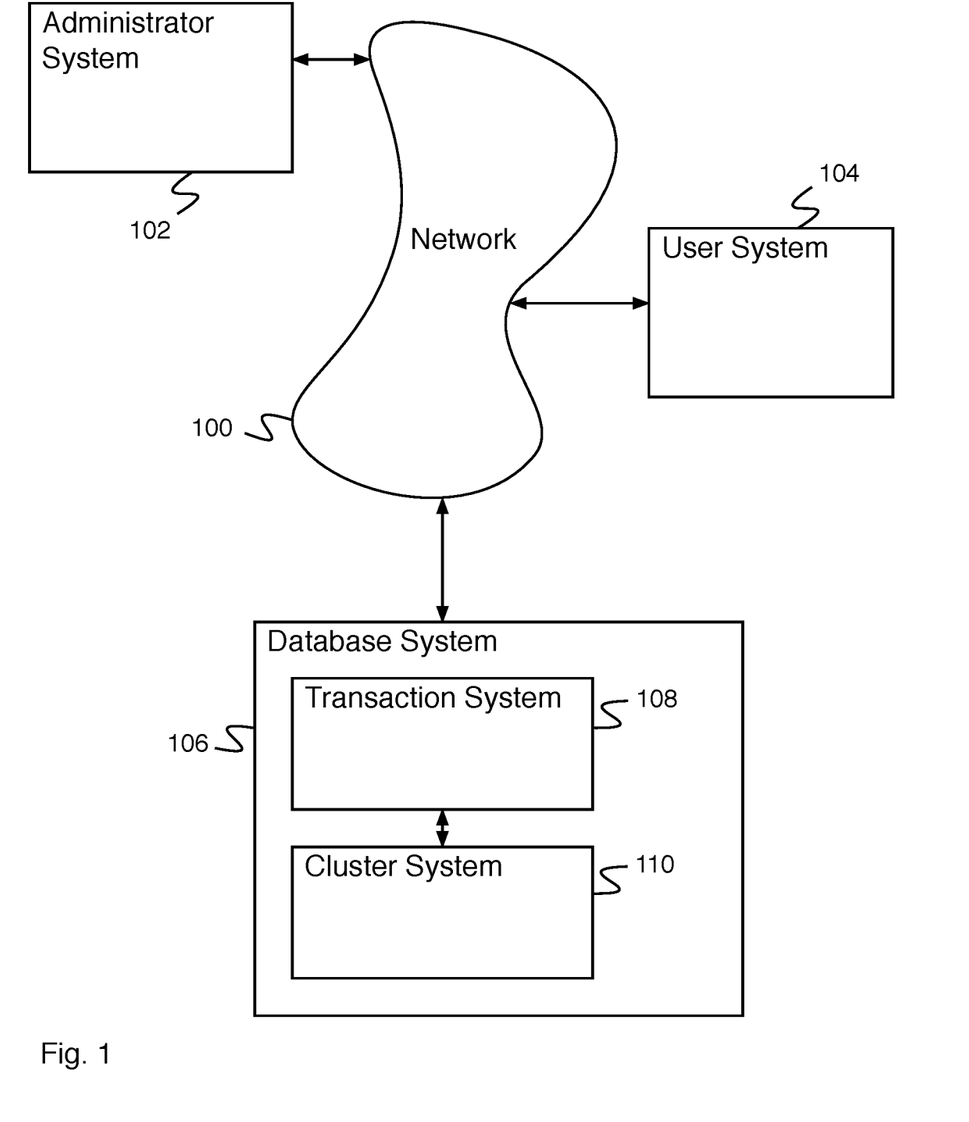
FIG. 1 is a block diagram illustrating an embodiment of a network system.

FIG. 1 is a block diagram illustrating an embodiment of a network system. In some embodiments, the network system of FIG. 1 comprises a system for managing data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and database system 106 communicate via network 100. In various embodiments, administrator system 102 comprises a system for an administrator to access data on database system 106, to create data structures on database system 106, to indicate removal of data structures on database system 106, or for any other appropriate purpose. User system 104 comprises a system for a user. In some embodiments, user system 104 comprises a system for accessing database system 106. In some embodiments, a user using user system 104 is associated with security information (e.g., describing data the user is or is not allowed to access). Database system 106 comprises a system for a database. In some embodiments, database system 106 comprises a system for an object-based database. In some embodiments, database system 106 comprises transaction system 108. In some embodiments, transaction system 108 comprises a system for storing data provided by a user (e.g., via user system 104 and network 100). In some embodiments, database system 106 comprises cluster system 110. In the example shown, cluster system 110 is in communication with transaction system 108. In some embodiments, cluster system 110 comprises a system for storing and processing large data sets.

Figure 2:
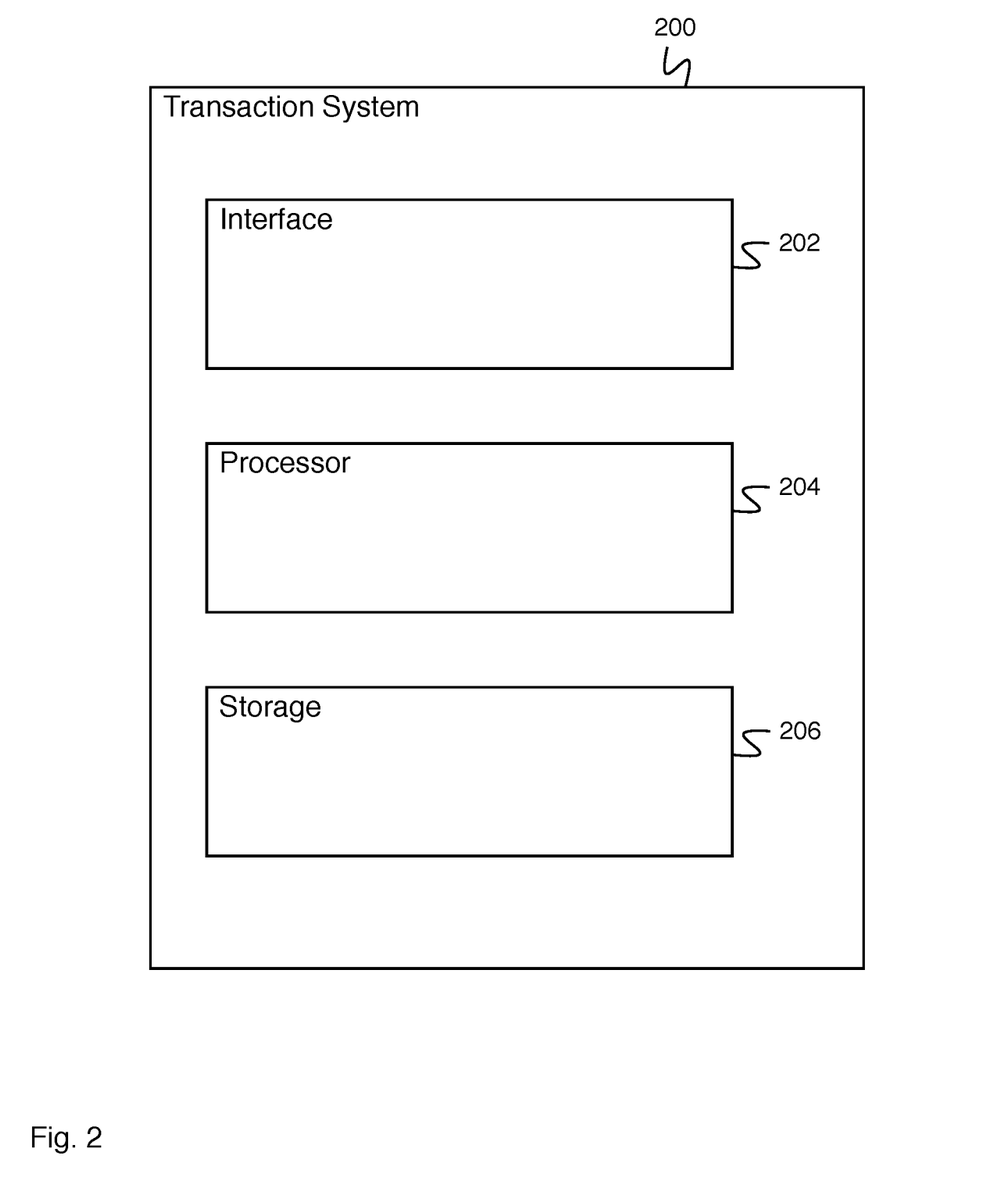
FIG. 2 is a block diagram illustrating an embodiment of a transaction system.

FIG. 2 is a block diagram illustrating an embodiment of a transaction system. In some embodiments, transaction system 200 comprises transaction system 108 of FIG. 1. In the example shown, transaction system 200 comprises interface 202, processor 204, and storage 206. In some embodiments, interface 202 comprises a system for communicating with a network. In some embodiments, interface 202 comprises a system for communicating with another system (e.g., a user system, an administrator system, a server system, etc.) via a network. In some embodiments, interface 202 comprises an interface for communicating with a cluster system. In various embodiments, interface 202 comprises an interface for receiving database data, for receiving database queries, for receiving security information, for receiving a process definition, for receiving process results, or for receiving any other appropriate information. In various embodiments, interface 202 comprises an interface for providing database data, for providing a request to ingest data, for providing a process definition, for providing an indication to execute a process, for providing a request for process results, or for providing any other appropriate information. Processor 204 comprises a processor for processing data. In some embodiments, processor 204 comprises a processor for executing database processing tasks. In some embodiments, processor 204 comprises a processor for providing an indication to execute a process on a cluster system. Storage 206 comprises a storage for storing database data. In some embodiments, storage 206 comprises a storage for object-based database data (e.g., a plurality of objects are stored, each object comprising database data and relations to other database data). In some embodiments, storage 206 comprises a storage for a transactional database (e.g., an ordered set of transactions is stored, each transaction representing a modification to one or more objects, enabling any historical state of the database to be recovered).

Figure 3A:
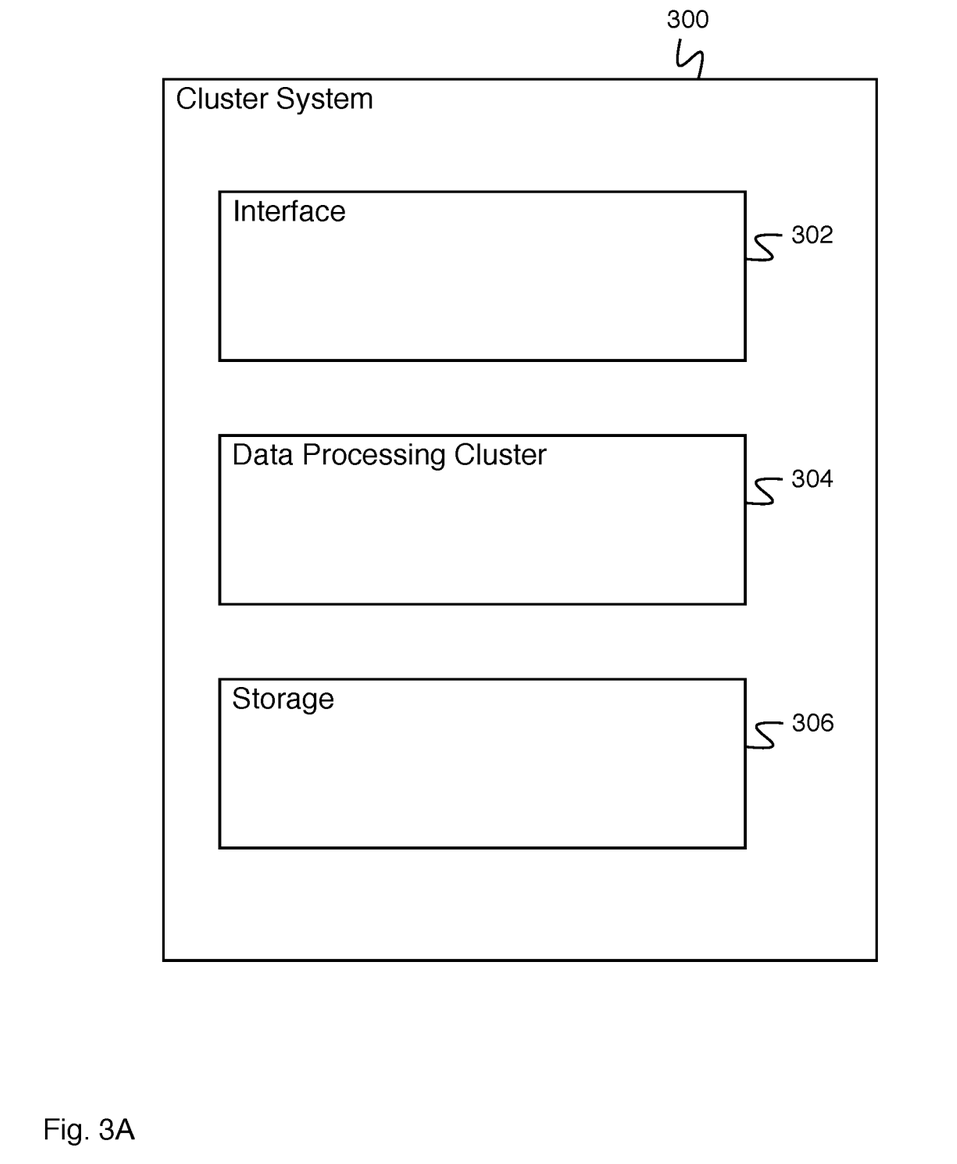
FIG. 3A is a block diagram illustrating an embodiment of a cluster system.

FIG. 3A is a block diagram illustrating an embodiment of a cluster system. In some embodiments, cluster system 300 of FIG. 3A comprises cluster system 110 of FIG. 1. In the example shown, cluster system 300 comprises interface 302. In some embodiments, interface 302 comprises an interface for communicating with a transaction system. In some embodiments, interface 302 comprises an interface for ingesting data. Data processing cluster 304 comprises a data processing cluster for processing data. Data processing cluster 304 comprises a plurality of computers for data processing. In various embodiments, data processing cluster 304 comprises 2, 3, 5, 6, 9, 22, 114, or any other appropriate number of data processing computers. In some embodiments, each data processing computer additionally comprises data storage. In the example shown, cluster system 300 additionally comprises storage 306. In some embodiments, storage 306 stores ingested data. In some embodiments, data processing computers of data processing cluster 304 store ingested data. In some embodiments, data processing cluster 304 and/or storage 306 additionally store process definitions. In some embodiments, data processing cluster 304 and/or storage 306 additionally store process results.

Figure 3B:
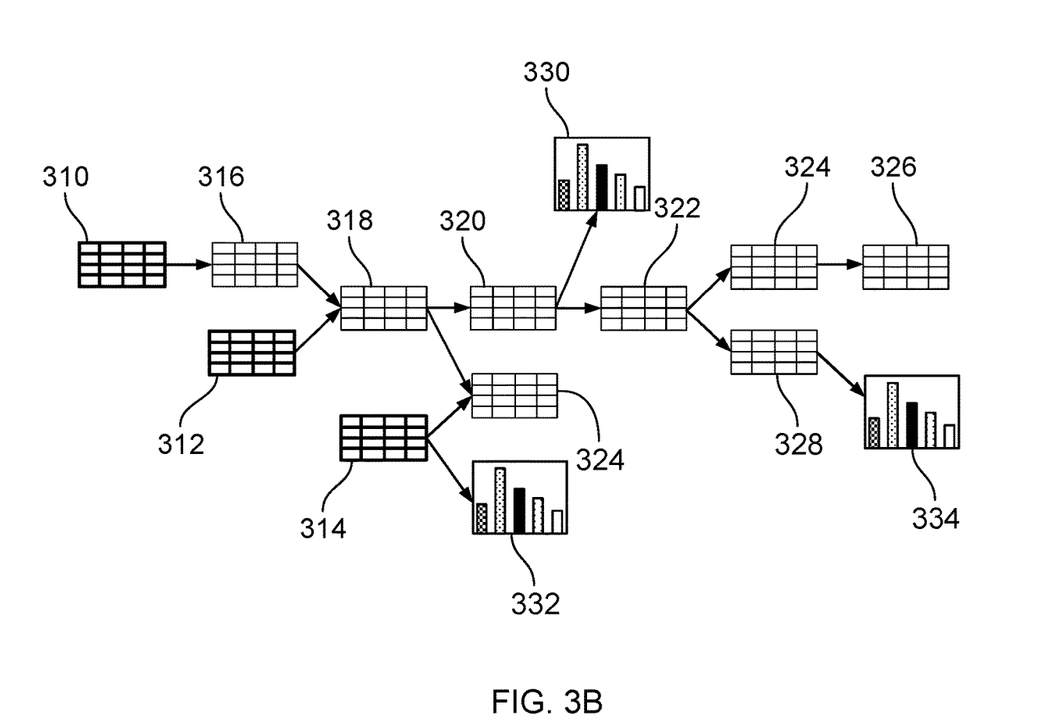
FIG. 3B is a block diagram illustrating an embodiment of data flows.

FIG. 3B is a block diagram illustrating an embodiment of data flows. In some embodiments, the data flows of FIG. 3B are examples of data processing flows in a cluster system such as cluster system 110 of FIG. 1 or cluster system 300 of FIG. 3A. In the example shown, data is ingested into a cluster system from an ingestion source and converted as appropriate to be available as a data source in the cluster. The converted ingested data (e.g., converted ingested data 310, converted ingested data 312, and converted ingested data 314) are the data ingested from an ingestion source but converted (e.g., formatted, with security associated, structurally configured, placed in a hierarchy, annotated, etc.) to be available for further processing or access for a report that is requested to be generated by a transaction server. In some embodiments, the converted ingested data is identified as source data for a report. In some embodiments, additional transformations or processing are defined to generate other data sources available for a report using one or more input data. For example, a transform is defined for transforming converted ingested data 310 to generate transformed data 316; a transform is defined for transforming transform data 316 and converted ingested data 312 to generate transformed data 318; a transform is defined for transforming transformed data 318 to generate transformed data 320; a transform is defined for transforming transform data 318 and converted ingested data 314 to generate transformed data 324; a transform is defined for transforming transformed data 320 to generate transformed data 322; a transform is defined for transforming transformed data 322 to generate transformed data 324; a transform is defined for transforming transformed data 322 to generate transformed data 328; and a transform is defined for transforming transformed data 324 to generate transformed data 326. Reports are generated based on one or more selected data sources—for example, report 332 uses converted ingested data 314 as a data source; report 330 uses transformed data 320 as a source; and report 334 uses transformed data 328 as a source. Although not graphically depicted, a report is able to select more than one data source for a report including converted ingested data sources and/or transformed data sources.

Figure 4:
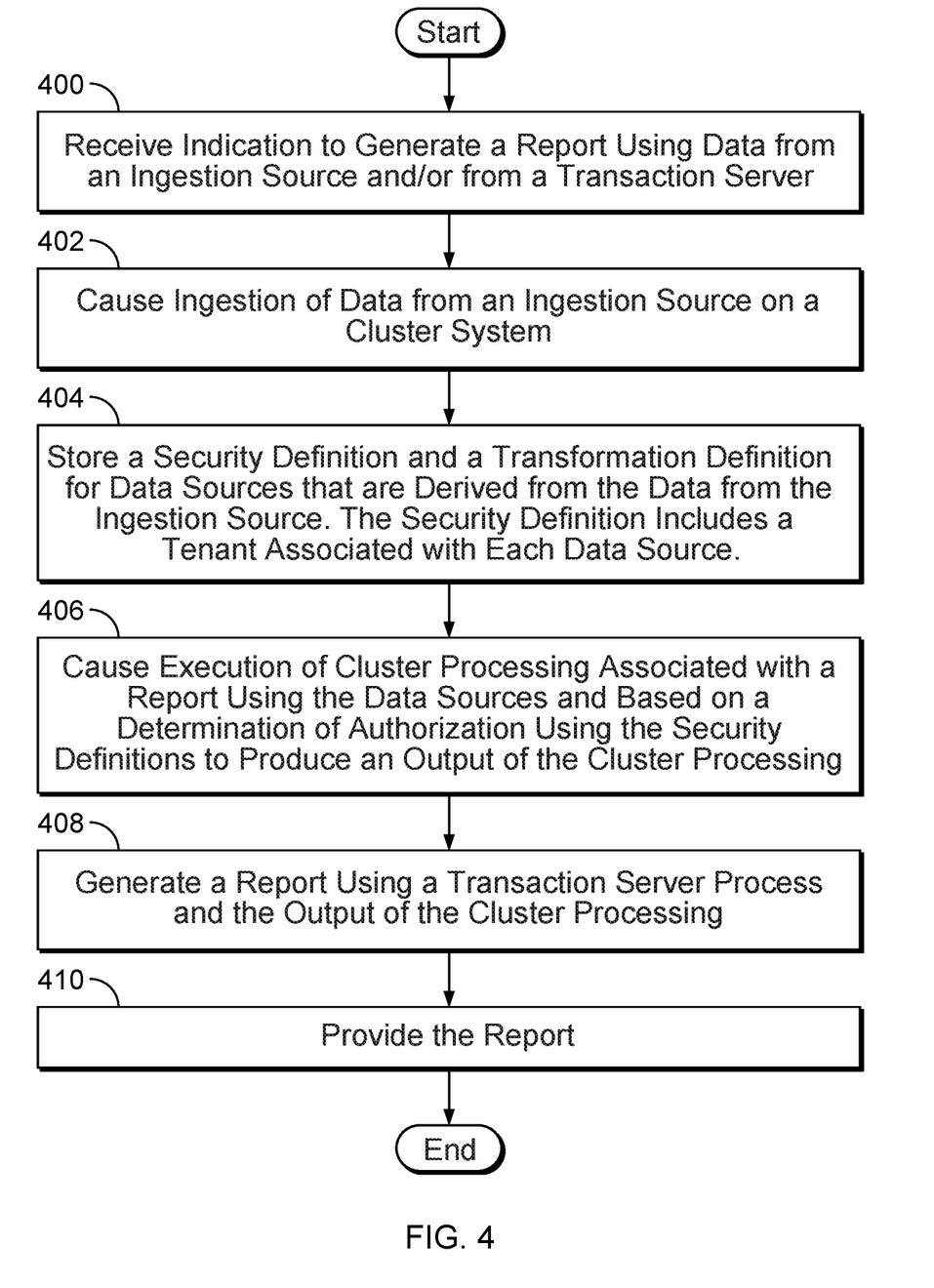
FIG. 4 is a flow diagram illustrating an embodiment of a process for managing data.

FIG. 4 is a flow diagram illustrating an embodiment of a process for managing data. In some embodiments, the process of FIG. 4 is executed by a transaction system (e.g., transaction system 108 of FIG. 1). In the example shown, in 400, an indication is received to generate a report using data from an ingestion source and/or from a transaction server. For example, a user indicates to generate a report. The report requires data from one or more sources. In various embodiments, some of the sources are internal to the transaction server, some of the sources are sources external to the transaction server that need to be ingested (e.g., into a cluster system), or any other appropriate source or sources. In 402, ingestion of the data from an ingestion source is caused on a cluster system. For example, a transaction server indicates to a cluster system to ingest the one or more ingestion sources that are external to the transaction server. In 404, a security definition and a transformation definition for data sources are stored for data sources that are derived from the data from the ingestion source. The security definition includes a tenant associated with each data source. For example, security settings associated with the ingested data source are stored on the transaction server (e.g., settings as to access rights regarding users, roles, etc.). In 406, execution of cluster processing associated with a report is caused using the data sources and based on a determination of authorization using the security definitions to produce an output of the cluster processing. For example, a transaction server provides a cluster with instructions to process data ingested from external sources. The cluster server checks authorization based on security information associated with the data and security information associated with the processing both of which are provided (at the same time or at different times) to the cluster system from the transaction server. In 408, a report is generated using a transaction server process and the output of the cluster processing. For example, the transaction server receives the output of the cluster processing, in the event that the processing passed the appropriate authorizations. The output is used to generate a report using any appropriate data associated with transaction server. In 410, a report is provided. For example, a report generated on the transaction server using data output from the cluster system and if appropriate from the transaction server and then provided to a user.

Figure 5:
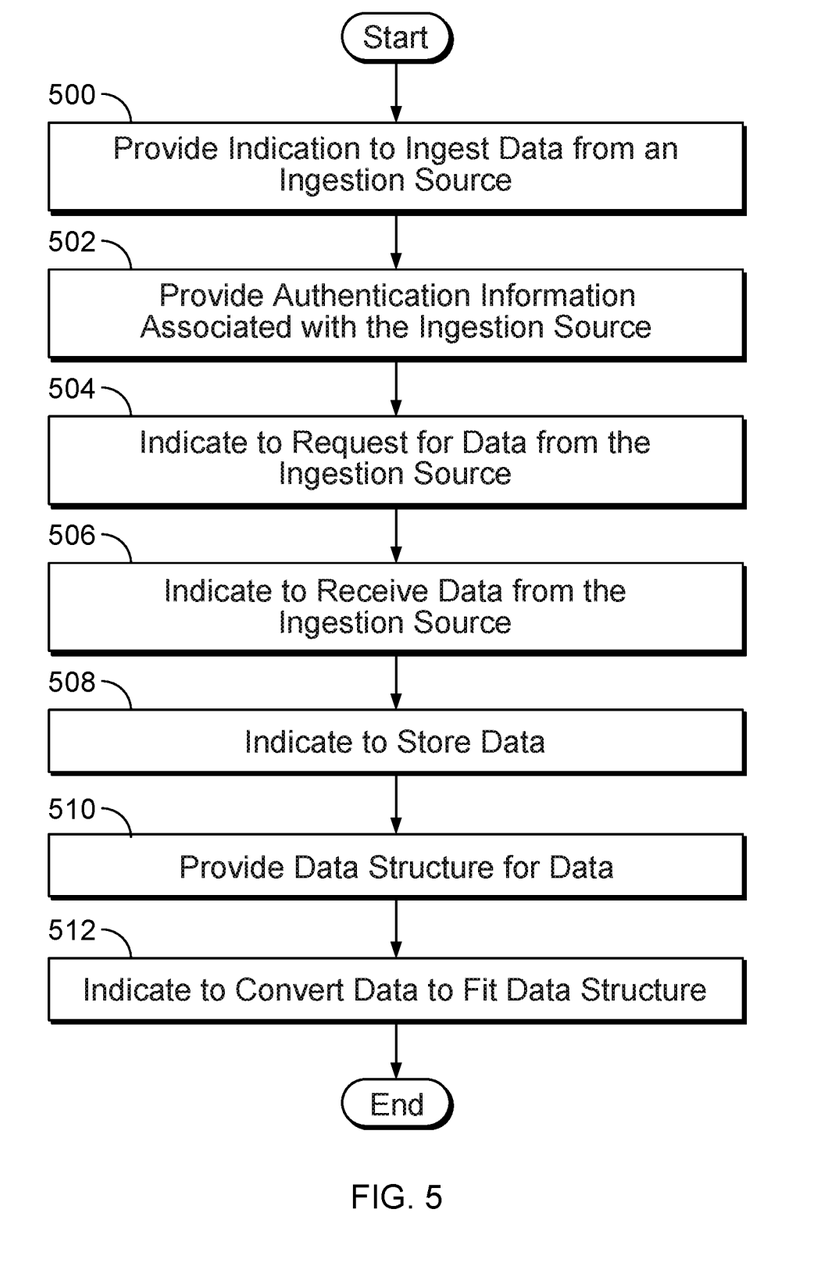
FIG. 5 is a flow diagram illustrating an embodiment of a process for ingesting a data set.

FIG. 5 is a flow diagram illustrating an embodiment of a process for ingesting a data set. In some embodiments, the process of FIG. 5 is executed by a cluster system (e.g., cluster system 110 of FIG. 1). In the example shown, in 500, an indication to ingest a data set from an ingestion source is provided. In some embodiments, the indication to ingest a data set from a data source comprises an indication to schedule data ingestion (e.g., an indication to ingest a data set from a data source at a later time, an indication to ingest data on a schedule, etc.). In some embodiments, a data source comprises an external data provider (e.g., data collection systems, data measurement systems, websites that collect user data, etc.). In 502, authentication information associated with the ingestion source is provided. In various embodiments, authentication information comprises a username, a password, single sign-on information, a certificate, a token, or any other appropriate authentication information. In 504, it is indicated to request data from the ingestion source. For example, a transaction server indicates to a cluster system to request data from a data source (e.g., an ingestion source). In some embodiments, the data request is performed at the time when the ingestion is scheduled. In some embodiments, the request comprises the authentication information. In 506, it is indicated to receive data from the ingestion source. For example, the transaction server provides instructions to a cluster system to receive data from the ingestion source. In some embodiments, the data is converted to an appropriate data structure and associated with appropriate security information and/or transformations. In 508, it is indicated to store the data. For example, the data is indicated to be stored on a cluster system storage. In some embodiments, the data is stored on the system storage of each of a set of data processing cluster systems. In various embodiments, the location of data stored is stored in an index, in a location in a data structure on a transaction database, in a reference location of an object stored in a transaction database, or in any other appropriate location. In some embodiments, the data is stored associated with a tenant, is stored encrypted for a tenant, is accessible based at least in part on a tenant access privilege, a user access privilege, or any other appropriate privilege, or any other appropriate manner of storage.

In some embodiments, metadata is stored associated with the ingested data. In some embodiments, metadata comprises information associated with the acquisition process— for example, location (e.g., IP location, server name, host name, directory name, etc.), credentials (e.g., user name for gaining access to the ingested data, password, certificate, etc.), system type (e.g., salesforce system, oracle system, etc.), etc. In some embodiments, metadata is generated for ingested data. In some embodiments, metadata comprises a type, a namespace, a name, data fields, or any other appropriate metadata. For example, a metadata structure associated with data comprises:

```
{
  "type": "record",
  "namespace": "GMS Inc.",
  "name": "Worker",
  "fields": [
    { "name": "first", "type": "string" },
    { "name": "last", "type": "string" },
    { "name": "age", "type": "int" }
  ]
}
```

In 510, a data structure for the data set is received. In various embodiments, a data structure for the data set comprises a set of rows, a set of columns, a set of data types, or any other appropriate structural information for a data set. In some embodiments, a data structure comprise an order or structure for ingested data. For example, a person information data structure comprises a first name, a last name, and an age. An example structure comprises:
{"first": "joe", "last": "Smith", "age": 20}
{"first": "paul", "last": "Johnson", "age": 30}
{"first": "mark", "last": "Jackson", "age": 55}

In 512, the data set is converted to fit the data structure. In various embodiments, the data conversion comprises selecting a column, filtering rows, grouping data, subsetting data, joining data, chaining data, or any other appropriate data conversions.

Figure 6:
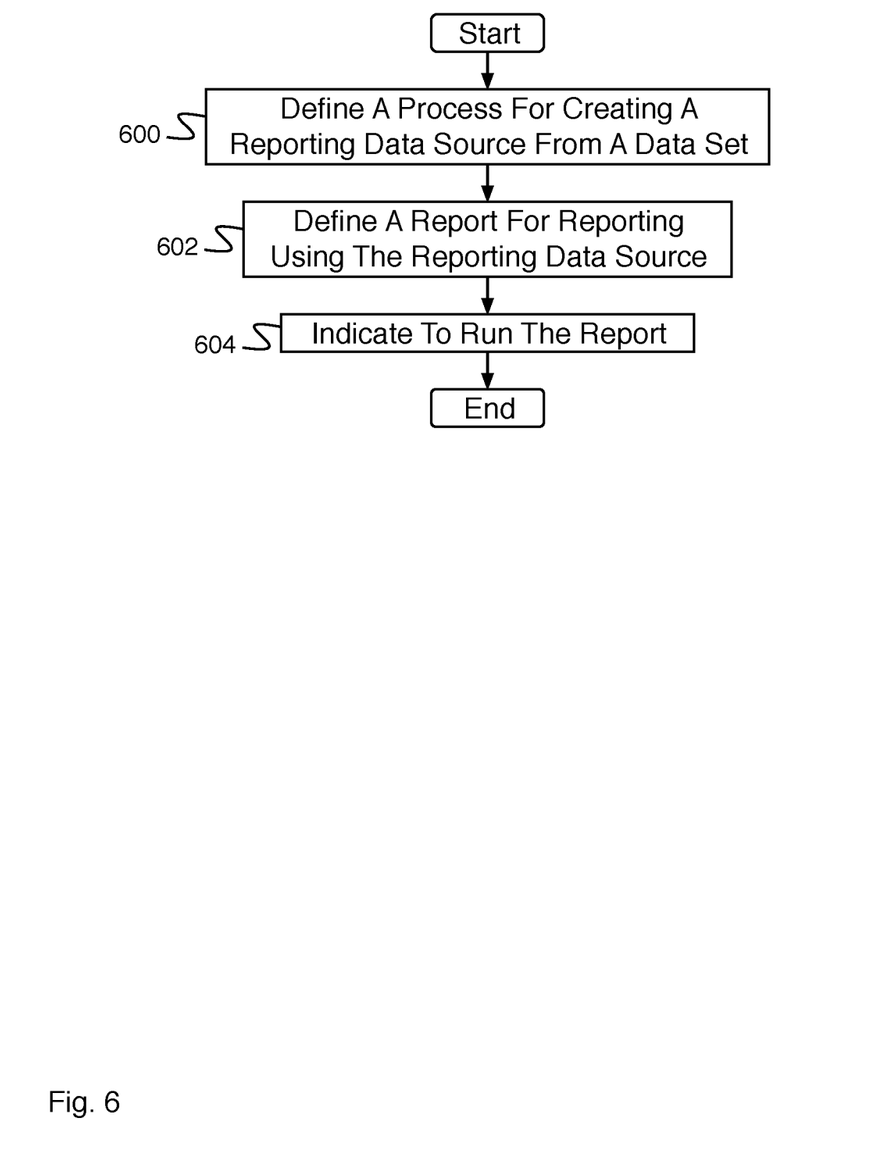
FIG. 6 is a flow diagram illustrating an embodiment of a process for running a report.

FIG. 6 is a flow diagram illustrating an embodiment of a process for running a report. In some embodiments, the process of FIG. 6 is performed by a user using a user system (e.g., user system 104 of FIG. 1). In the example shown, in 600, a process is defined for creating a reporting data source from a data set. In some embodiments, the data set comprises a data set ingested using the process of FIG. 5. In 602, a report is defined for reporting using the reporting data source. In 604, the user indicates to run the report. In some embodiments, running the report accesses the reporting data source. In some embodiments, running the report causes the process to be run.

Figure 7:
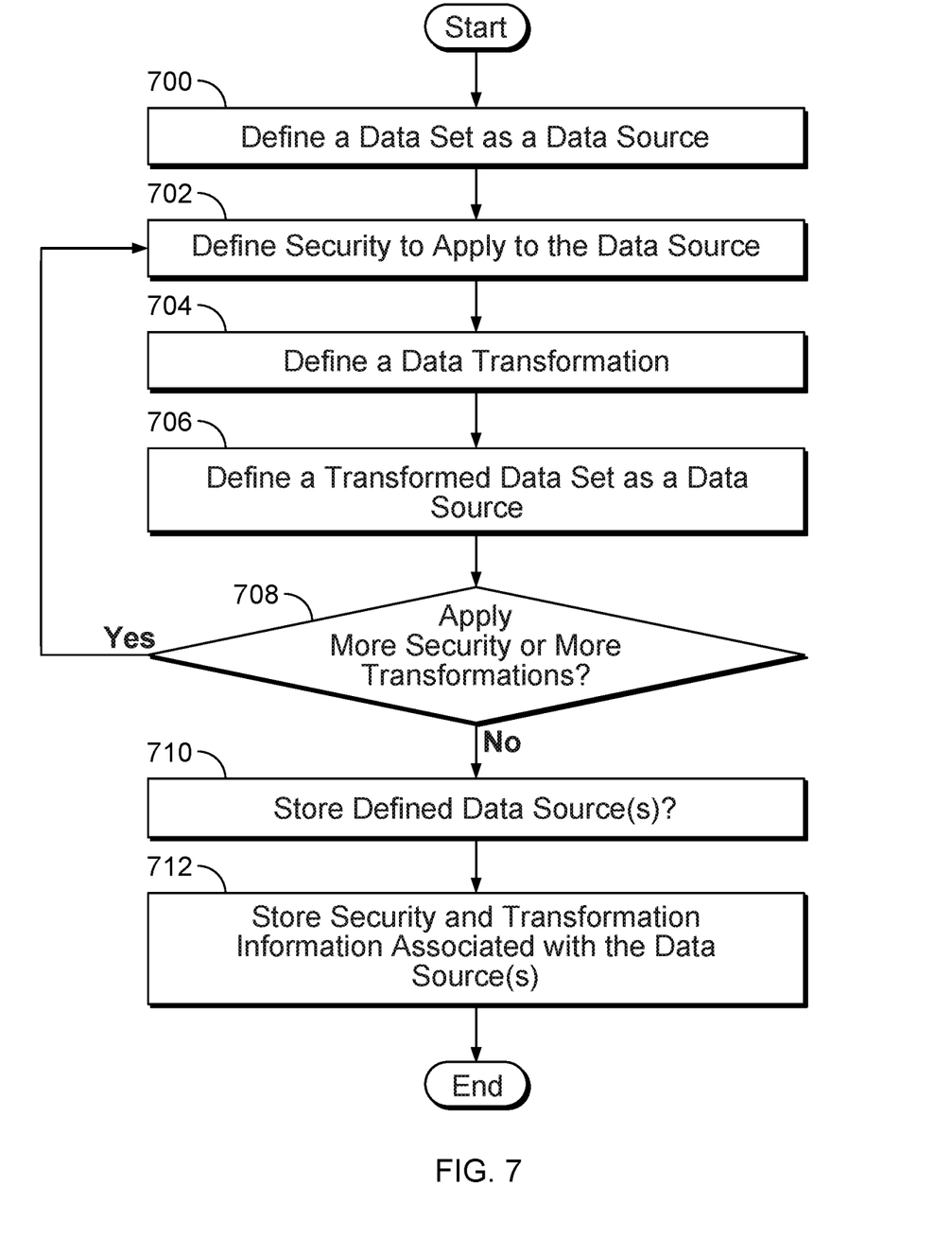
FIG. 7 is a flow diagram illustrating an embodiment of a process for defining a process for creating a reporting data source.

FIG. 7 is a flow diagram illustrating an embodiment of a process for defining a process for creating a reporting data source. In some embodiments, the process of FIG. 7 implements 600 of FIG. 6. In the example shown, in 700, a data set is selected as a data source. In some embodiments, more than one data set is selected as a data source. In 702, security to apply to the data source is defined. For example, security associated with the data source is defined. In 704, a data transformation is defined. In various embodiments, transforming the data set comprises adding rows, deleting rows, changing row names, adding columns, deleting columns, changing column names, changing data types, changing data units, rounding data, truncating data, filtering, machine learning, data mining (e.g., statistical mining, predictive mining, analytical mining), or transforming the data set in any other appropriate way. In some embodiments, selecting transformations comprises selecting an ordering for applying transformations to data sets. In 706, a transformation data set is defined as a data source. In 708, it is determined whether more security or more transformation are to be applied. In the event that more security or more transformations are to be applied, then control passes to 702. In the event that more security or more transformations are not to be applied, then in 710 defined data source(s) are stored. For example, data set(s) or transformed data set(s) is/are defined as data source(s) for reports. In 712, security and transformation information associated with the data source(s) are stored.

Figure 8:
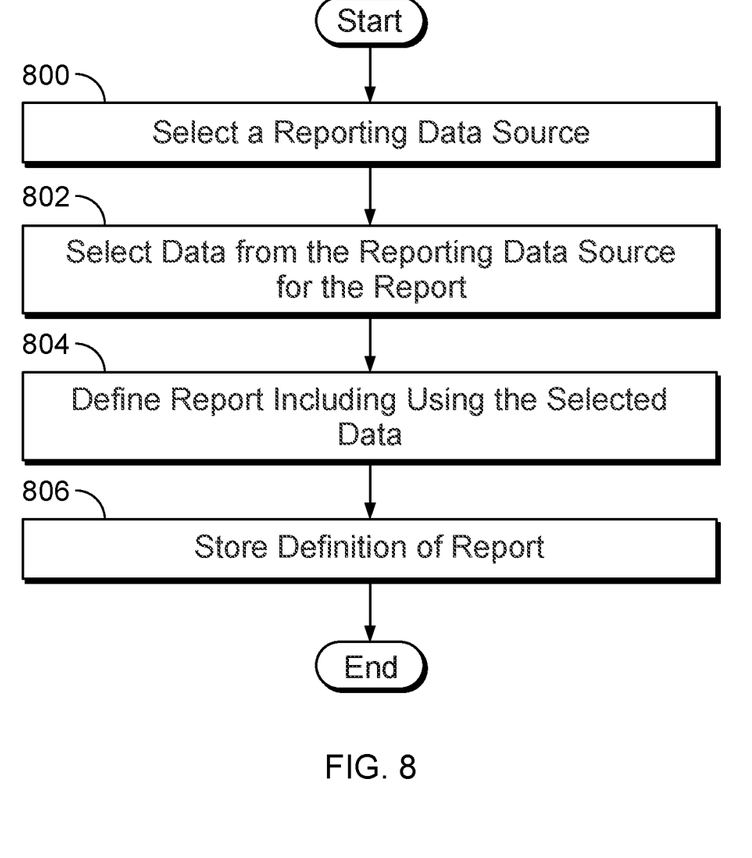
FIG. 8 is a flow diagram illustrating an embodiment of a process for defining a report for reporting using a report data source.

FIG. 8 is a flow diagram illustrating an embodiment of a process for defining a report for reporting using a report data source. In some embodiments, the process of FIG. 8 implements 602 of FIG. 6. In the example shown, in 800, a reporting data source is selected. In some embodiments, a reporting data source is selected from transformation outputs indicated as reporting data sources (e.g., in 704 of FIG. 7). In 802, data from the reporting data source is selected for the report. In some embodiments, a subset of data of the reporting data source is selected. In some embodiments, a transformation is indicated to select data from the reporting data source for the report. In 804, a report is defined including using the selected data. In 806, a definition of the report is stored.

Figure 9:
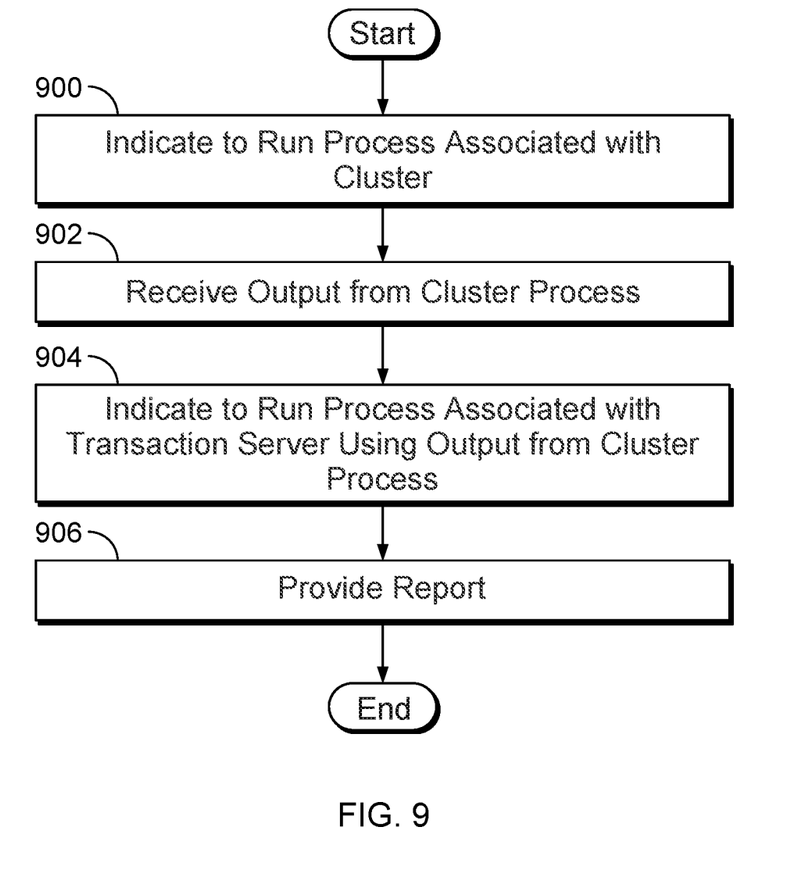
FIG. 9 is a flow diagram illustrating an embodiment of a process for running a report.

FIG. 9 is a flow diagram illustrating an embodiment of a process for running a report. In some embodiments, the process of FIG. 9 implements 604 of FIG. 6. In the example shown, in 900 it is indicated to run a process associated with a cluster. In 902, output from the cluster process is received. In 904, it is indicated to run a process associated with a transaction server using the output from the cluster process. In 906, a report is provided. For example, a report is provided to a user and/or stored on a transaction server.

Figure 10:
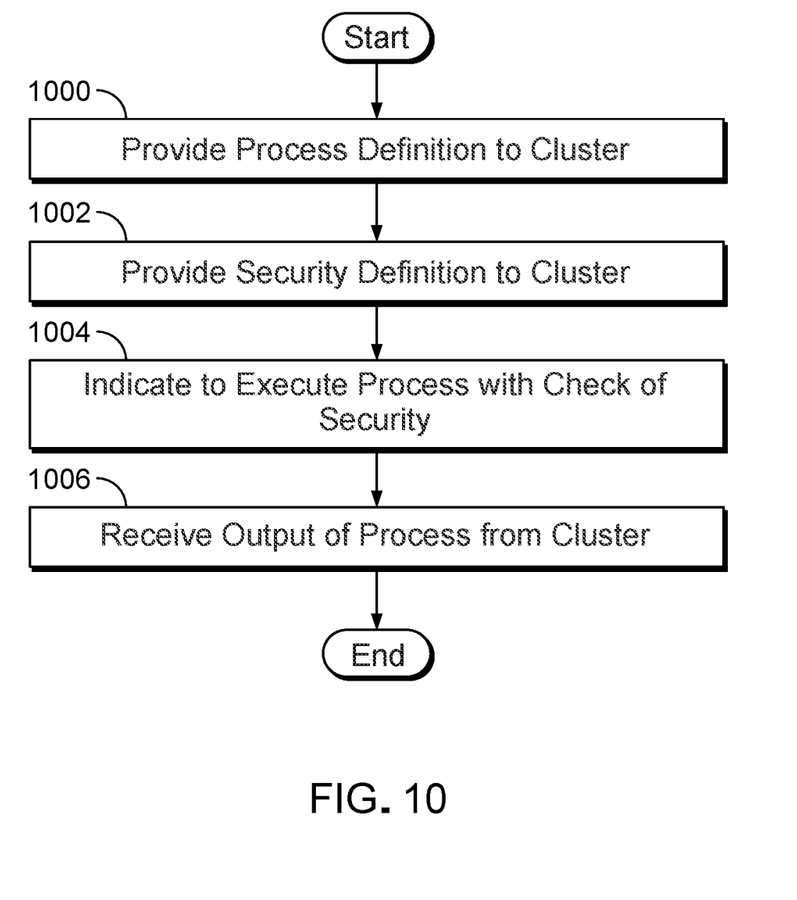
FIG. 10 is a flow diagram illustrating an embodiment of a process for indicating the running a process on a cluster.

FIG. 10 is a flow diagram illustrating an embodiment of a process for indicating the running a process on a cluster. In some embodiments, the process of FIG. 10 is executed by a cluster system (e.g., cluster system 110 of FIG. 1). In the example shown, in 900, a process definition is provided to a cluster. In 1002, received security definition is provided to the cluster. In 1004, it is indicated to execute the process with a check of the security. In 1006, the output of the process from the cluster is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for managing data, comprising:
a processor to:
cause ingestion of data from an ingestion source on a cluster system, wherein the data from the ingestion source comprises one or more data sets;
cause creation of one or more data sources derived from the data, wherein the one or more data sources are associated with a report;
store a security definition and a transformation definition for the one or more data sources, wherein the security definition includes a tenant associated with each data source of the one or more data sources, and wherein the transformation definition includes a transform associated with each data source of the one or more data sources;
cause execution of cluster processing associated with the report using the one or more data sources and based at least in part on a determination of authorization using the security definition to produce an output of the cluster processing; and
generate the report using a transaction server and the output of the cluster processing, comprising to:
define a process for creating a reporting data source from a data set of the one or more data sets;
apply the transform to the data set to obtain a transformed data source, wherein the transform comprises one or more of the following: adding a row, deleting a row, changing a row name, adding a column, deleting a column, changing a column name, changing a data type, changing a data unit, rounding data, truncating data, machine learning, data mining, statistical mining, predictive mining, and/or analytical mining; and
store security and transformation information associated with the transformed data source to obtain the reporting data source; and
define the report based on the reporting data source; and
an interface to:
provide the report.

2. The system of claim 1, wherein the data from the ingestion source is stored on the cluster system.

3. The system of claim 2, wherein a location of the data is stored in an index.

4. The system of claim 2, wherein a location of the data is stored in a data structure on a transaction database.

5. The system of claim 2, wherein a location of the data is stored in a reference location of an object stored in a transaction database.

6. The system of claim 1, wherein the data is converted after ingestion.

7. The system of claim 6, wherein the data is converted by fitting data into a data structure.

8. The system of claim 1, wherein the ingestion source is one of a plurality of ingestion sources.

9. The system of claim 1, wherein the security definition and the transformation definition are stored on the transaction server.

10. The system of claim 1, wherein the cluster processing comprises the creation of the one or more data sources.

11. The system of claim 1, wherein the processor is further to receive an indication to ingest data.

12. The system of claim 11, wherein the indication to ingest data comprises an indication to schedule data ingestion.

13. The system of claim 11, wherein the indication to ingest data comprises authentication information.

14. The system of claim 1, wherein the interface is further to provide a data structure to the cluster system, wherein the data structure is associated with the one or more data sets.

15. The system of claim 1, wherein the determination of authorization comprises determining whether the cluster processing and the one or more data sources are both associated with the tenant.

16. The system of claim 1, wherein determination of authorization comprises determining whether a user requesting the report associated with the cluster processing is associated with the tenant.

17. The system of claim 1, wherein the processor is further to cause storage of the one or more data sources.

18. The system of claim 1, wherein the one or more data sources are stored on the cluster system.

19. The system of claim 1, wherein the transformation definition comprises at least two transforms, wherein the at least two transforms comprise:
a first transform associated with a first data source of the one or more data sources, wherein the first data source is obtained by applying the first transform to at least one data set of the one or more data sets; and
a second transform associated with a second data source of the one or more data sources, wherein the second data source is obtained by applying the second transform to at least one other data source of the one or more data sources.

20. A method for managing data, comprising:
causing, using a processor, ingestion of data from an ingestion source on a cluster system, wherein the data from the ingestion source comprises one or more data sets;
causing the creation of one or more data sources derived from the data, wherein the one or more data sources are associated with a report;
storing a security definition and a transformation definition for the one or more data sources, wherein the security definition includes a tenant associated with each data source of the one or more data sources, and wherein the transformation definition includes a transform associated with each data source of the one or more data sources;
causing execution of cluster processing associated with the report using the one or more data sources and based at least in part on a determination of authorization using the security definition to produce an output of the cluster processing;
generating the report using a transaction server and the output of the cluster processing, comprising:
defining a process for creating a reporting data source from a data set of the one or more data sets;
applying the transform to the data set to obtain a transformed data source, wherein the transform comprises one or more of the following: adding a row, deleting a row, changing a row name, adding a column, deleting a column, changing a column name, changing a data type, changing a data unit, rounding data, truncating data, machine learning, data mining, statistical mining, predictive mining, and/or analytical mining; and
storing security and transformation information associated with the transformed data source to obtain the reporting data source; and
defining the report based on the reporting data source; and
providing the report.

21. A computer program product for managing data, the computer program product being embodied in a non-transitory computer readable storage medium and comprising computer instructions for:
causing, using a processor, ingestion of data from an ingestion source on a cluster system, wherein the data from the ingestion source comprises one or more data sets;
causing the creation of one or more data sources derived from the data, wherein the one or more data sources are associated with a report;

storing a security definition and a transformation definition for the one or more data sources, wherein the security definition includes a tenant associated with each data source of the one or more data sources, and wherein the transformation definition includes a transform associated with each data source of the one or more data sources;

causing execution of cluster processing associated with the report using the one or more data sources and based at least in part on a determination of authorization using the security definition to produce an output of the cluster processing;

generating the report using a transaction server and the output of the cluster processing, comprising:

defining a process for creating a reporting data source from a data set of the one or more data sets;

applying the transform to the data set to obtain a transformed data source, wherein the transform comprises one or more of the following: adding a row, deleting a row, changing a row name, adding a column, deleting a column, changing a column name, changing a data type, changing a data unit, rounding data, truncating data, machine learning, data mining, statistical mining, predictive mining, and/or analytical mining; and     storing security and transformation information associated with the transformed data source to obtain the reporting data source; and   defining the report based on the reporting data source; and providing the report.

\* \* \* \* \*